United States Patent
Svensson et al.

[11] Patent Number: 5,986,903
[45] Date of Patent: *Nov. 16, 1999

[54] CONTROL APPARATUS FOR A CONVERTER FOR TRANSMITTING ELECTRIC POWER BETWEEN AN ALTERNATING VOLTAGE NETWORK AND A DIRECT VOLTAGE NETWORK

[75] Inventors: Kjell Svensson, Ludvika; Rolf Pålsson, Saxdalen, both of Sweden

[73] Assignee: Asea Brown Boveri AB, Västeras, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/951,104
[22] Filed: Oct. 15, 1997

[30] Foreign Application Priority Data

Mar. 24, 1997 [SE] Sweden ................. 9701063

[51] Int. Cl.⁶ .................................................. H02H 7/00
[52] U.S. Cl. ................... 363/51; 363/54; 363/128
[58] Field of Search ............................. 363/51, 54, 128; 361/18, 87, 89

[56] References Cited

U.S. PATENT DOCUMENTS

| | | | |
|---|---|---|---|
| 4,638,416 | 1/1987 | Neupauer et al. | 363/35 |
| 4,719,554 | 1/1988 | Bertschi | 363/51 |
| 4,847,744 | 7/1989 | Araki | 363/49 |
| 4,941,079 | 7/1990 | Ooi | 363/132 |
| 5,214,575 | 5/1993 | Sugishima et al. | 363/37 |
| 5,371,664 | 12/1994 | Seki | 363/51 |
| 5,798,916 | 8/1998 | Stacey et al. | 363/135 |

FOREIGN PATENT DOCUMENTS

0 762 622 A1  12/1997  European Pat. Off. .

OTHER PUBLICATIONS

Patent Abstracts of Japan, Method of Controlling Inverter Device Using Self Extinguishing Semiconductor Element, Abstract of JP 7–231674 A (Hitachi Ltd.), 1995/Aug.

*Primary Examiner*—Shawn Riley
*Attorney, Agent, or Firm*—Pollock, Vande Sande & Amernick

[57] ABSTRACT

A plant for transmitting electric power between a direct voltage network and an alternating voltage network through a power station. A converter of a station has two current valves connected in series, each having one turn-on and turn-off type breaker and a diode connected anti-parallel therewith. Circuits are provided to detect the direction and the intensity of the current through the converter, as well as the current valve through which it flows to actuate the control apparatus on the basis of the detected current level and the identity of the valve carrying the current. The control apparatus operates to commutate current through the valve which is not carrying current when a detected current level in the current carrying valve exceeds a first predetermined level.

13 Claims, 1 Drawing Sheet

CONTROL APPARATUS FOR A CONVERTER FOR TRANSMITTING ELECTRIC POWER BETWEEN AN ALTERNATING VOLTAGE NETWORK AND A DIRECT VOLTAGE NETWORK

BACKGROUND OF THE INVENTION

The present invention relates to a plant for transmitting electric power between a direct voltage network and at least one alternating voltage network connected thereto through a station. Specifically, at least one VSC-converter converts direct voltage into alternating voltage and, conversely converts alternating voltage to direct voltage. An apparatus controls the converter of the station to regulating the current flowing between the alternating voltage network and direct network voltage. The converter has on the direct voltage side thereof two current valves connected in series between the two poles of the direct voltage network and the alternating voltage network connected between the two valves. Each current valve has at least one turn-on and turnoff type breaker and a diode connected in anti-parallel therewith. The breakers of the two current valves are oriented in the same current carrying direction.

Such a plant has recently been known through the thesis "PWM and Control of Two and Three Level High Power Voltage Source Converters" by Anders Lindberg, Kungliga Tekniska Hogskolan, Stockholm, 1995, which describes such a plant for transmitting electric power through a direct voltage network for High Voltage Direct Current (HVDC). It is pointed out that the invention is not restricted to this application, but for illustration only and not in any way limiting the invention to the application of plants of this type.

Before the advent of the plants according to the thesis, plants for transmitting electric power through a direct voltage network for High Voltage Direct Current have used line-commutated CSC (Current Source Converter) converters in power transmission stations. Since the development of IGBTs (Insulated Gate Bipolar Transistor=bipolar transistor having an insulated gate) for high voltage applications for valves in converters, which may easily be turned on and turned off simultaneously, VSC (Voltage Source Converter) converters for forced commutation are now an alternative to the line-commutated CSC.

This type of transmission of electric power between a direct voltage network for High Voltage Direct Current and alternating voltage networks connected thereto offers several important advantages with respect to line-commutated CSCs. For instance the active and reactive power flow may be controlled independently of each other, and there is no risk of commutation failures in the converter and no corresponding risk of transfer of commutation failures between different HVDC links, which may take place in a line-commutated CSC. Furthermore, there is the possibility of feeding power to a weak alternating voltage network or a network without a generator of its own (a dead alternating voltage network) along with other advantages.

In a plant of this type, the derivative of the current through the inductance located on the alternating voltage side of the converter is directly proportional to the difference between the voltage of the alternating voltage network and the direct voltage of the direct voltage network. This means that should for example the alternating voltage suddenly decrease as a consequence of a ground fault in the alternating voltage network, then the current through that breaker in one of the converter valves, normally an IGBT, which is conducting at that moment increases rapidly. The current derivative is then determined by the phase position of the alternating voltage, and the amplitude depends upon the pre-fault current. The margin between the normal peak current through the converter and the maximum current which may be turned off by the breakers is preferably kept as small as possible. This means that it is difficult for the current regulation carried out by the control apparatus to limit the current before the over current protection is activated. It is a significant disadvantage if the over current protection is activated, since it results in a temporary blocking of the converter, which in turn results in an increase of the voltage of the direct voltage network disturbing all the converters connected thereto. Thus, there is a need for rapidly limiting the current and preventing temporary blocking of the converter.

The same problem may suddenly arise if the alternating voltage suddenly increases rapidly and the direct voltage has a low value. This may occur when the alternating voltage is reconnected after a disconnection of the alternating voltage network as a consequence of a fault. The result may be a high returning alternating voltage, which may in addition thereto be combined with a low direct voltage which was low during the disconnection.

BRIEF SUMMARY OF THE INVENTION

The object of the present invention is to provide a plant in which the problem of a rapidly increasing current through the converter is reduced, and over current protection in the plant which temporarily blocks the converter is avoided to a greater degree than was previously possible.

The object according to the invention is obtained by providing a plant with control apparatus to detect the direction and the amplitude of the current through the converter, and the current valve in which current is flowing. Means compare the amplitude of the current, based upon information from said apparatus, with a predetermined lower first current value which exceeds the current normally passed through the converter, and to a predetermined second upper value. Upon determining that the current which flows through one of the current valves is between said values, the control apparatus controls the converter to commutate the current to flow through the other current valve.

By commutating the current to the opposed current valve, an over current through the breaker in one of the current valves may be reduced instantaneously, so that temporary blocking of the converter is avoided. A condition for commutating current to the other value is a recognition that the current flows through a breaker in one of the valves, and under no circumstance is the commutation to the other valve activated if the current flows through the diode of the one valve. This would result in a commutation of the current over to the breaker of the other current valve, and the current would increase even faster.

The presence of the predetermined second upper value, prevents commutation from taking place when the current is too high, when no type of commutation will reduce the high current to an acceptable value. Instead, a temporary blocking of the converter has to take place as a consequence of an otherwise too high power generation in the components of the plant.

According to a preferred embodiment of the invention, the control apparatus activates an over current protection, temporarily blocking the entire converter upon a detection of a current having an intensity between said predetermined values, when it simultaneously recognizes that the current flows through the diode of one of the current valves. This ensures that the converter diode current is temporarily blocked, instead of commutating current to the breaker of the other current valve, which would lead to an even higher current through the converter and a risk of damage to the station equipment.

According to another preferred embodiment, which constitutes a further development of the previous embodiment, the control apparatus activates the over current protection when the current, after a predetermined period of time since it exceeded the first value, is still higher than this value. By delaying temporary blocking of the converter, a temporary blocking of the converter may be prevented when current is flowing through a diode should the over current be caused by a transient over voltage in the alternating voltage network.

According to another preferred embodiment of the invention the control apparatus activates an over current protection when a value of the current exceeding the second value is detected, temporarily blocking the entire converter irrespectively whether the current flows through the diode or the breaker of the current valve which is conducting. Thus, should the current for any reason increase to a value exceeding the second value of breaker current without switching the breaker to the diode of the other current valve, or the current increase over this second value when the diode is conducting current, the over current protection temporarily blocking the converter is immediately activated and the converter and the equipment connected thereto are protected thereby.

According to another preferred embodiment of the invention the control apparatus continuously regulates the current when as a result of the comparisons of the value of the current with these values, the apparatus is activated. It is advantageous to let the regular current regulation function of the converter be "overridden" during the short period of time in which the apparatus is activated, since this also influences the current in the correct direction to ensure that it is kept at an acceptable level following actuation of the apparatus.

According to another preferred embodiment of the invention the plant comprises more than one VSC-converter. In the case of a plurality of such converters in the plant, it is particularly important that a temporary blocking of the converter is as far as possible avoided, since a blocking thereof leads to a temporary increase of the direct voltage of the direct voltage network. The increase is detected by the other converters, and there is a risk of activation of over voltage protection for blocking one of the converters, further increasing the direct voltage producing a chain reaction having costly consequences.

According to another preferred embodiment of the invention the plant is designed for transmitting electric power through a direct voltage network for High Voltage Direct Current (HVDC). The advantages of the plant according to the invention are particularly apparent in this preferred application.

Further advantageous features of the invention will appear from the following description and the claims.

BRIEF DESCRIPTION OF THE DRAWINGS

With reference to the appended drawings, below follows a description of a preferred embodiment of the invention cited as an example.

DETAILED DESCRIPTION OF THE INVENTION

Figure 1:
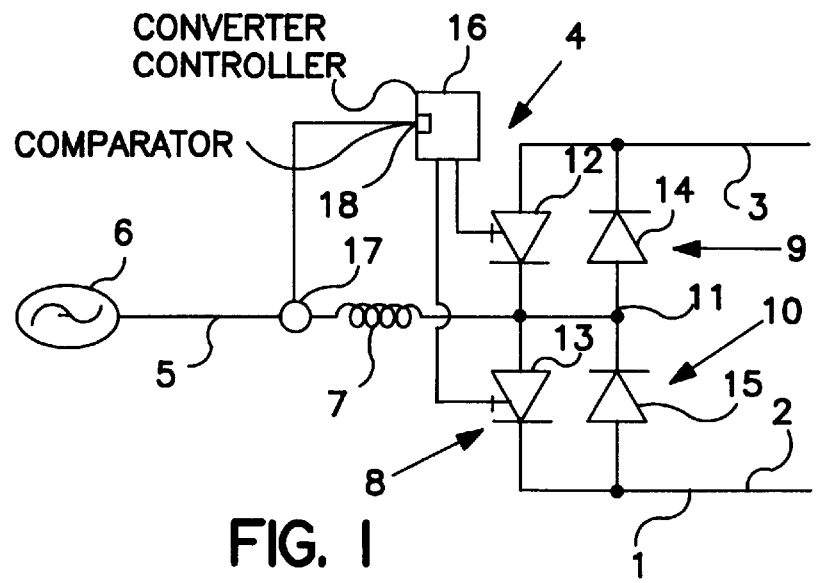
FIG. 1 is a schematic block diagram illustrating the principle of the invention.

The structure of a plant for transmitting electric power according to the invention is schematically illustrated in FIG. 1, in which only the different components directly relating to the invention have been shown in the drawing for facilitating understanding of the invention. The plant comprises a direct voltage network 1 for High Voltage Direct Current (HVDC-High Voltage Direct Current).

The plant also has an alternating voltage network 5 which is indicated by an alternating voltage symbol 6 and an inductance 7 connected to the direct voltage network through a station 4. The station is designed to transmit electric power between the direct voltage network 1 and the alternating voltage network 5. The power may be fed in from the alternating voltage network to the direct voltage network, or fed out from the direct voltage network to the alternating voltage network. Thus, the alternating voltage network may have generators of electric power or only be connected to consumers thereof. The station comprises at least one VSC-converter 8 adapted to convert direct voltage into alternating voltage, and conversely, alternating voltage to direct voltage. However, it is within the scope of the invention that the station comprises a plurality of such converters, although only one such converter has been shown in the figure. It is also possible that the alternating voltage network has more than one phase, most often three phases, but the alternating voltage network is in the figure summarized through one single line. Thus, in the case of more than one phase, each phase has a converter of its own.

The VSC-converter 8 comprises in a conventional way first and second current valves 9, 10. Current valves 9, 10 are connected in series between the two poles 2, 3 of the direct voltage network, and the alternating voltage network is connected to the junction 11 of the valves. Each current valve has at least one turn-on and turn-off type breaker 12, 13 and a diode 14, 15 connected anti-parallel therewith. The breakers of the two current valves are directed in the same direction. The breakers are preferably in the form of a series of IGBTs in each current valve, even though they are summarized in the figure through one symbol. A great number of IGBTs may, for example, be connected in series in a single valve and turned on and turned off simultaneously, so as to act as one single breaker. In this way the voltage across the valve is distributed among the different breakers connected in series. The control of the breakers takes place in a conventional way by pulse width modulation (PWM). The diode 5 may also be replaced by a series of diodes connected in series.

The station 4 further comprises an apparatus 16 for controlling the converter. This apparatus controls the converter of the station to regulate the current therethrough. The regulation takes place in a conventional way supplying control pulses to the different current valves of the converter. The apparatus attempts to regulate the current to a value which transfers the desired power between the two networks while assuring that the current does not increase over a maximum acceptable value.

The plant has further members 17 to detect the direction and the intensity of the current through the converter, as well as identifying the valve through which the current is instantaneously flowing. Current amplitude information is sent by the member 17 to comparing means 18 which is part of the control apparatus 16. The comparing means on the basis of information from the member 17, compares the amplitude of the current with a predetermined lower first current value which exceeds the current normally accepted through the converter, and compares the measured current intensity with a predetermined second upper value so as to control the converter.

Figure 2:
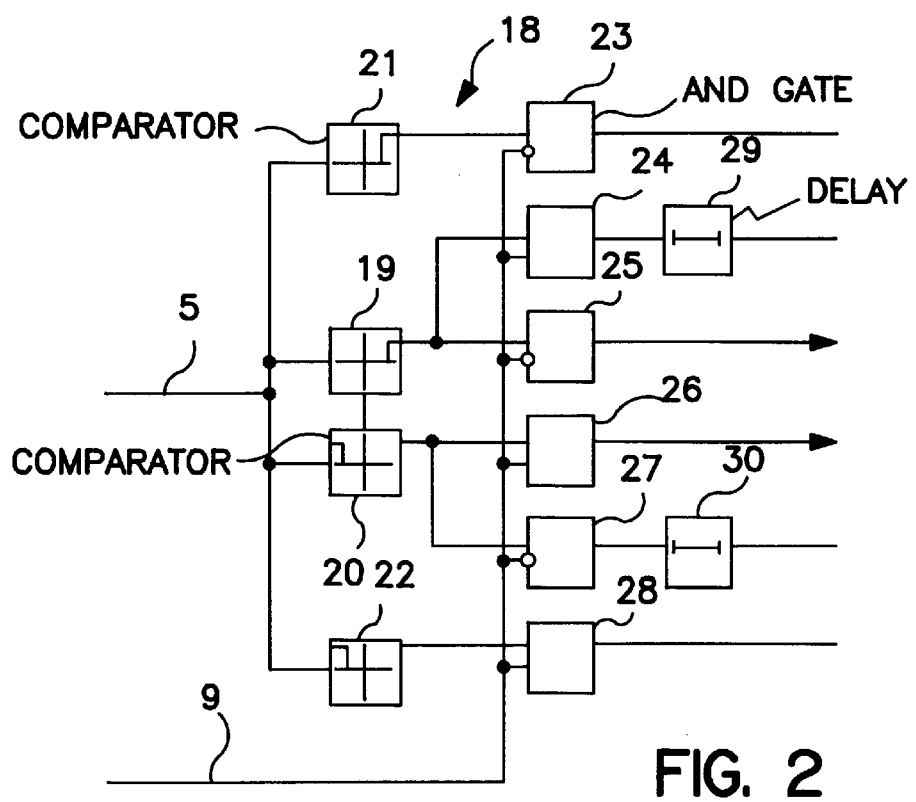
FIG. 2 is a block diagram illustrating the function of the comparing means included in the plant according to the invention.

FIG. 2 illustrates how the alternating current in the alternating voltage network 5 is subjected to different comparisons in the comparing means 18, in which the function of the comparing means is illustrated with the first current valve 9 as a reference. The amplitude of the alternating current through the converter is compared with a predetermined lower first value, which is indicated in boxes 19, 20, and a second predetermined upper value, which is indicated in the boxes 21 and 22. The columns in the first quadrant in the boxes 19 and 21 means that the current flows from the alternating voltage network to the current voltage network, while the columns in the fourth quadrant in the boxes 20 and 22 indicate that the current flows in the opposite direction. When the condition shown by the respective box 19–22 is fulfilled, i.e. current flows through the converters in the indicated direction, and its intensity is above the level indicated in the box, the respective box (boxes 19 and 20) sends a logical one to one or two logical AND-gates 23–28. On the second input of these logical gates a logical one is delivered for 23, 25 and 27 if the first current valve 9 is not conducting, and a logical one is delivered for 24, 26 and 28 if it is conducting. As long as the current through the converter is lower than the predetermined lower first value, which constitutes a limit value for the boxes 19 and 20, the comparing means 18 will not interfere and influence the way in which the control apparatus 16 controls the converter. However, should the current for any reason rapidly increase and arrive above this value, for example from a sudden decrease of the alternating voltage as a consequence of a ground fault in the alternating voltage network, means 18 acts to control the converter.

The different cases which may result in control over the converter will now be discussed. Assuming that the current moves from the alternating voltage network to the direct voltage network when the first predetermined value of the current intensity is exceeded, a logical one is sent from the box 19 to the gates 24 and 25. If the current flows through the second current valve 10, which means that it flows through the IGBT 13, then the gate 25 will receive a logical one at the second input thereof, controlling apparatus 16 to commutate the current to flow through the diode 14 of the first current valve 9 instead of the current valve 10 reducing the current instantaneously, and avoiding temporary blocking of the converter. When the first current valve 9 is conducting instead of current valve 10, which means that both inputs of the gate 24 receive a logical one, then no commutation to the opposite current valve 10 may take place, since in this case current flows through the diode 14 and a commutation would mean an even more rapid increase of the current through the IGBT 13. However, a delay of a certain period of time, which is indicated through the box 29 is imposed, before the converter is temporarily blocked, and blocking takes place only if the current remains above the first value after this delay period. It is pointed out that box 29, 30 may have a more complex design so as to calculate the stresses on the diodes 14, 15. The length of this delay is determined by the specification for the diode used. Such a delay may possibly prevent temporary blocking from occurring also from diode current should the over current be caused by a transient over voltage in the alternating voltage network. If for any reason the function according to the box 25 does not function there is as an extra safety measure from the box 21, which means that if the current flows through the IGBT 13 of the second current valve 10 which exceeds a predetermined second upper value, then a temporary blocking of the converter will always be triggered.

Conversely, the following happens when the condition of the gates 26, 27 and 28 are fulfilled. If the current through the IGBT 12 in the first current valve 9 is above said first lower value (i.e., the condition according to box 20 is fulfilled), the gate 26 actuates the control apparatus to commutate the current to flow through the diode 15 of the second current valve 10 instead of the IGBT, so that an instantaneous reduction of the current is obtained. If, instead, the condition according to box 20 is fulfilled, but the current flows for the moment through the diode 15, then gate 27 receives a one at both inputs thereof, but any commutation to the opposite first current valve 9 may not take place because activation of temporary blocking of the converter is delayed by the box 30. Activation only occurs if the higher current condition persists through the delay period. When the higher current condition according to the box 22 is fulfilled, i.e. the current through the IGBT 12 of the first current valve 9 is above the predetermined second upper value, then the gate 28 will ensure a temporary blocking of the converter. The temporary blocking of the converter is preferably removed as soon as the current therethrough has fallen below the predetermined lower first value.

It is emphasized that the regular current regulation of the control apparatus "runs" all the time and is accordingly over-ridden by the regulation carried out by the apparatus should the foregoing conditions be fulfilled.

The invention is of course not in any way restricted to, the preferred embodiment described above, but many possible modifications thereof would be apparent to a man skilled in the art, without departing from the basic idea of the invention, such as is defined in the claims.

The plant may as already mentioned have more components not shown in the drawings, such as for example harmonic filters for removing harmonic currents generated from the pulse width modulation.

Although symbols have been shown in FIG. 1 for some members, means or the like, it is not at all necessary that these are present as separate components, but the functions they fulfil may very well be provided by any component also having other functions, and values may not be directly measured but calculated from values of another measured quantity.

The plant may have more than one station, in which each station has apparatus for interfering with the current regulation. It is then also possible that one of the stations controls its converter for regulating the voltage of the direct voltage network.

Even if the functions corresponding to the boxes 21, 23, 22 and 28 in FIG. 2 could be omitted, they constitute an additional safety.

The second predetermined level is not to be interpreted as restricting the invention, but it only mentions the obvious fact that the converter is of course blocked should the current get to high.

Detecting which of the current valves through which current flows is based on the detection on the control pulses of the control apparatus to determine which breaker is on.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments, and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. Control apparatus for a plant converter which connects a direct voltage network to an alternating voltage network comprising:

first and second current valves connecting said alternating voltage network to a direct voltage network, each of said valves including an electrically controllable breaker connected in parallel with a diode;

means for detecting the level of current flowing through said valves;

means for comparing the level of current flowing through said valves with a first predetermined value, and for detecting which of said valves is conducting said current; and means for controlling said valves to divert current flowing through said valve conducting current to the other of said valves when the current through a breaker of said valve conducting current exceeds said predetermined value.

2. The control apparatus according to claim 1 further comprising means for activating an over current protection means for temporarily blocking said converter when said current exceeding said predetermined value is flowing through a diode of one of said valves.

3. The control apparatus according to claim 2 wherein said means for activating said over current protection means delays activation until said current has exceeded said predetermined value for a predetermined period of time.

4. The control apparatus according to claim 2, wherein said means for comparing compares said current flowing through said valves with a second predetermined value, and if said current exceeds said second predetermined value, activates said over current protection means irrespective of whether said current is flowing in a breaker or a diode of one of said valves, and inhibits diversion of said current to another valve.

5. The control apparatus according to claim 1 wherein said breakers comprise an insulated gate bipolar transistor.

6. The control apparatus according to claim 1 further comprising:

means for controlling said valves to regulate the current flow to said alternating current network to a nominal value in the presence and absence of current which exceeds said predetermined value.

7. A method for controlling a converter connecting a direct voltage network to an alternating voltage network through first and second serially connected valves comprising:

monitoring the current intensity flowing through said first and second valves of said converter;

comparing the current intensity with the first intensity level and a second intensity level higher than said first intensity level, both of which are above a normal current intensity;

controlling said valves to commutate current through said second valve when the current intensity through a breaker of said first valve exceeds said first intensity level; and blocking said converter if said current through said first valve exceeds said second intensity level.

8. The method according to claim 7 further comprising:

inhibiting commutation of said current from said first valve to said second valve when said current is flowing through a diode connected in parallel with said breaker.

9. The method according to claim 1 further comprising:

blocking said converter when said current intensity is above said first intensity level and said current is flowing through a diode connected in parallel with said breaker.

10. The method according to claim 9 further comprising:

inhibiting blocking of said converter until said current intensity exceeds said first intensity level for a predetermined period of time.

11. Control apparatus for a plant converter which connects a direct voltage network to an alternating voltage network comprising:

first and second current valves connecting said alternating voltage network to a direct voltage network, each of said valves including an electrically controllable breaker connected anti-parallel with a diode which carry current in opposite directions;

means for detecting the level of current flowing through said valves;

means for determining when the level of current flowing through said valves exceeds a first predetermined level of current;

means for detecting which of said valves is conducting said current;

means for determining whether current is flowing through a breaker of said valve or a diode of said valve;

means for controlling said valves to divert current flowing through said valve conducting current to the other of said valves when the current through a breaker of said valve conducting current exceeds said predetermined level; and means for blocking said converter when said current flows through a diode of said valve which exceeds said predetermined level.

12. The control apparatus according to claim 11 wherein said means for blocking said converter apparatus operates when said current exceeds said predetermined value for a predetermined period of time.

13. The control apparatus according to claim 11, wherein said means for determining determines when said current flowing through said valves exceeds a second predetermined value if said current exceeds said second predetermined value, inhibits diversion of said current to another valve and activates said means for blocking irrespective of whether said current is flowing in a breaker or a diode of one of said valves.

* * * * *